US012703398B2

(12) United States Patent
Straela, Jr.

(10) Patent No.: US 12,703,398 B2
(45) Date of Patent: Aug. 11, 2026

(54) MULTI-VEHICLE REMOTE ASSISTANCE

(71) Applicant: GM Cruise Holdings LLC, San Francisco, CA (US)

(72) Inventor: Jeffrey William Straela, Jr., Winter Park, FL (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 195 days.

(21) Appl. No.: 18/359,766

(22) Filed: Jul. 26, 2023

(65) Prior Publication Data

US 2025/0033674 A1 Jan. 30, 2025

(51) Int. Cl.
*B60W 60/00* (2020.01)
*B60W 50/14* (2020.01)

(52) U.S. Cl.
CPC .......... *B60W 60/005* (2020.02); *B60W 50/14* (2013.01); *B60W 2050/146* (2013.01); *B60W 2420/403* (2013.01); *B60W 2556/50* (2020.02); *B60W 2756/10* (2020.02)

(58) Field of Classification Search
CPC ............... B60W 60/005; B60W 50/14; B60W 2050/146; B60W 2420/403; B60W 2556/50; B60W 2756/10
See application file for complete search history.

(56) References Cited

U.S. PATENT DOCUMENTS 12,158,756 B1 * 12/2024 Mertens ............... G05D 1/2279
12,269,509 B1 * 4/2025 Dickerson ......... B60W 60/0015
2023/0182776 A1 * 6/2023 Plascencia-Vega .......................... B60W 60/0015 701/24
2024/0036571 A1 * 2/2024 Goldman ....... G06Q 10/063112
2024/0111284 A1 * 4/2024 Bilonenko ............. G06Q 10/02
2024/0386794 A1 * 11/2024 Rogenfelt ............ G08G 1/0104
2025/0036131 A1 * 1/2025 Lacaze .................. B60W 10/04

* cited by examiner

*Primary Examiner* — Toya Pettiegrew
(74) *Attorney, Agent, or Firm* — CANTOR COLBURN LLP

(57) ABSTRACT

The present disclosure generally relates to providing remote assistance to multiple autonomous vehicles and, more specifically, providing multiple requests for remote assistance to a remote assistance operator to provide sequential assistance. A method includes receiving, from a first autonomous vehicle, a first request for remote assistance; receiving, from a second autonomous vehicle, a second request for remote assistance; identifying a first location of the first autonomous vehicle and a second location of the second autonomous vehicle on a map; determining, based on the map, whether there is a trigger associated with the first autonomous vehicle and the second autonomous vehicle; and communicating both the first request for remote assistance and the second request for remote assistance to a remote assistance operator to provide sequential assistance. Systems and machine-readable media are also provided.

20 Claims, 6 Drawing Sheets

MULTI-VEHICLE REMOTE ASSISTANCE

BACKGROUND

1. Technical Field

The present disclosure generally relates to providing remote assistance to multiple autonomous vehicles and, more specifically, providing a remote assistance operator controls for remotely providing sequential assistance to multiple autonomous vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
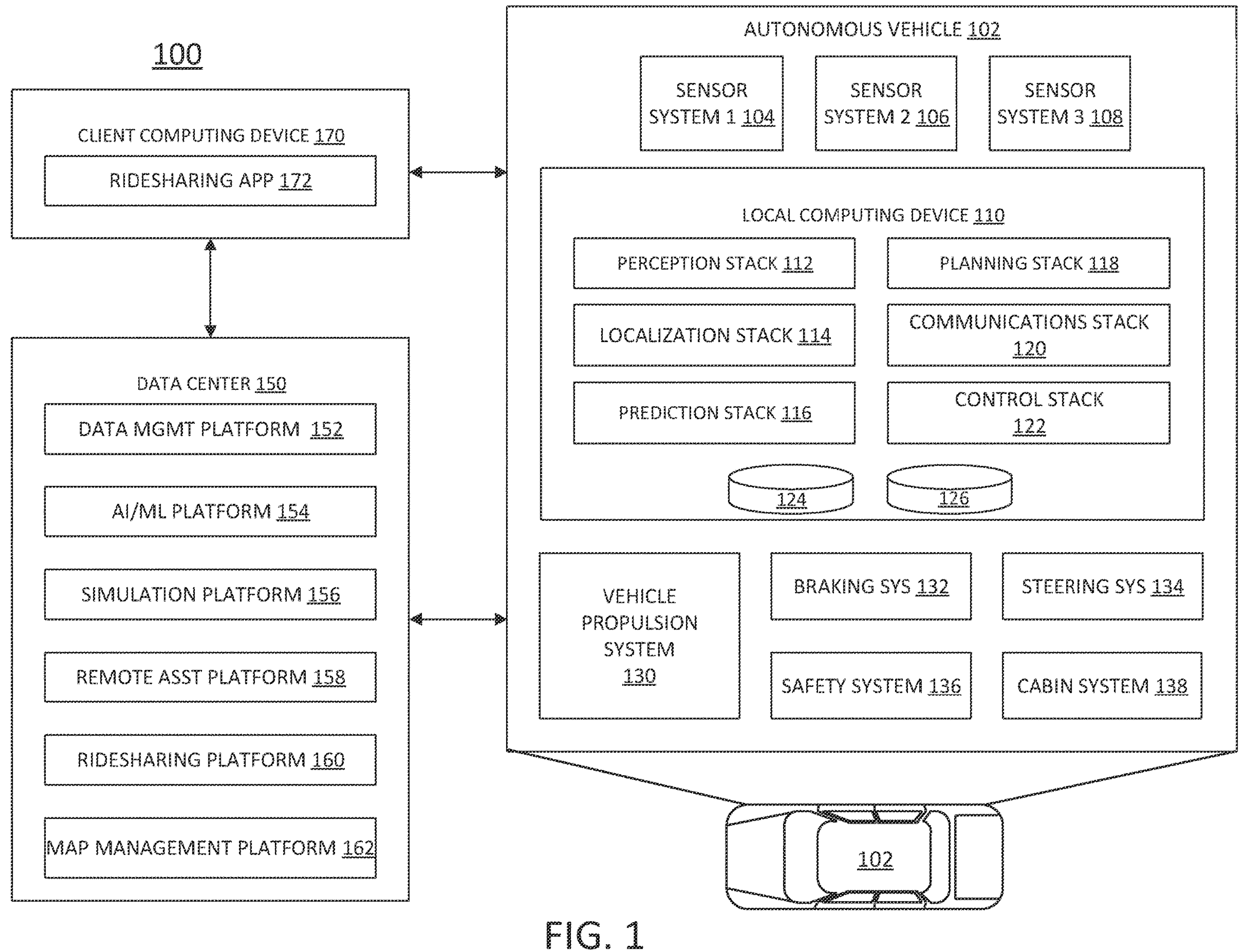
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

An autonomous vehicle (AV) is a motorized vehicle that can navigate a roadway without a human driver and can perform a variety of tasks. For example, AVs can be used to provide ride-hailing services, delivery services, and street services (e.g., street patrol, street cleaning, etc.), among other tasks. As the number of AVs navigating the roadways continues to increase, congestion among AVs (and other vehicles) can also increase. For example, after a large event (such as, for example, a sports game, a convention, or a concert, etc.) concludes, people exiting the event can hail an AV for transportation (via a ride-hailing app on a smartphone, for example). In this scenario, a large number of people can simultaneously hail AVs, resulting in a large number of AVs converging on a single location over a relatively short period of time. In some examples, a large number of AVs converging on a single location in a small amount of time can cause traffic congestion.

As discussed in more detail below, the AV can navigate roadways without a human driver based on sensor signals generated by multiple sensor systems. Based at least partly on signals received from the multiple sensor systems, several mechanical systems can be used to maneuver or operate the AV. However, in some cases, an AV can become stuck (e.g., may experience a stuck state) and may need or require human assistance/intervention to proceed. In some examples, when an AV becomes stuck (e.g., unable to autonomously continue navigating without receiving human assistance, unable to complete a maneuver and/or operation without human assistance, stopped prior to reaching a destination to wait for human assistance, stopped in response to a failure or error event, etc.) in a congested area (such as at the conclusion of a large event), one or more vehicles located within a proximity to the stuck AV can also become stuck due to the stuck AV blocking one or more paths of the one or more vehicles. In some scenarios, an AV that is stuck can block a large number of vehicles (e.g., AVs and/or other vehicles), thereby increasing congestion and effectively blocking many (or all) vehicles from proceeding.

A stuck AV can request remote assistance when stuck and unable to proceed. For example, an AV can become stuck (e.g., experience a stuck state) if the AV is unable to perform a maneuver needed for the AV to continue its route, is prevented by traffic rules and/or AV constraints from performing a maneuver needed for the AV to continue its route, experiences a software error/failure, or is unable to navigate a scene, among other reasons. When the AV becomes stuck, the AV can transmit a request for assistance from a human operator, such as a remote operator. In some examples, a remote operator can receive the request for assistance via a remote assistance platform, and use the remote assistance platform to monitor the AV, access sensor data collected by the AV, review a scene of the AV generated based on sensor data, and/or send the AV instructions that the AV can use to overcome/resolve the stuck state (e.g., continue navigation, perform a maneuver to continue operation/navigation, resolve an error/failure, etc.).

As discussed in more detail below, a remote assistance platform can generate and transmit instructions regarding the operation of the AV. For example, the remote assistance platform can receive an input(s) from a remote operator, and send to the AV instructions generated based on the input(s). The instructions can assist and facilitate the stuck AV. A remote assistance operator can be located remotely from the AV, and can access (e.g., via the remote assistance platform) sensor data from the AV such as camera feeds and other sensor data (e.g., LIDAR data, RADAR data, accelerometer data, gyroscope data, acoustic data, etc.), map data, AV logs, and/or other information about the AV, a state of the AV, an operation of the AV, and/or a scene of the AV. The remote assistance operator can use such information to determine how to assist the stuck AV.

In some cases, a scene can include multiple AVs that are in a stuck state within proximity to each other (e.g., the AVs requesting assistance are within a threshold distance from each other and/or are within a same bounded area (e.g., an area defined by one or more blocks, communities, or a grid layout)), and which may generate multiple remote assistance requests. The remote assistance requests associated with a scene (and/or a geofence) can become increasingly large, and may need or demand assistance from a large number of remote assistance operators. For example, in some scenarios (for example, after a large event), there can be a plurality of AVs that are stuck within a region and requesting remote assistance, and each stuck AV may receive remote assistance from (e.g., may be controlled by) a separate remote assistance operator. Thus, as the number of stuck AVs increases, the number of remote assistance operators used to provide assistance to such AVs may also increase. This can become expensive, inefficient, and difficult to manage.

In some examples, it can be useful for a remote assistance operator to coordinate the movements of various AVs stuck within a region, rather than using a different remote assistance operator for each separate stuck AV within the region. For example, the movement of one AV can affect the movement of another AV within a region, such as a traffic congestion scenario. In some scenarios, each stuck AV in a single congested region can be controlled by a different remote assistance operator. Remote assistance operators can be located in the same or different locations from each other. Moreover, it can be difficult to communicate AV and related information between multiple remote assistance operators. In some cases, it can be more efficient to allow a remote assistance operator to control multiple AVs stuck within a region. For example, in order to undo traffic congestion, it might be more efficient to maneuver a first stuck AV in a particular way while the other stuck AVs wait (or move out of the way of the first stuck AV, for example) to receive instructions from the remote assistance operator after assisting the first stuck AV. However, in a scenario where each stuck AV is assigned to a different remote assistance operator (and where the remote assistance operators can have difficulty communicating among multiple remote assistance operators), each remote assistance operator can be independently attempting to undo the traffic congestion in conflicting and/or inefficient ways, or even making the situation worse due to lack of communication and lack of coordination.

Described herein are systems, apparatuses, processes (also referred to as methods), and computer-readable media (collectively referred to as "systems and techniques") to enable a remote assistance operator to monitor, control, and/or otherwise assist multiple AVs experiencing a stuck state. In some examples, the remote assistance (RA) operator can be provided with an option to assert control over multiple AVs requesting assistance to more efficiently coordinate the movements of the AVs. The AVs can have one or more commonalities (e.g., common factors). For example, the AVs may be located within a same region (e.g., a geofence, a scene, etc.), may need assistance performing a same or similar maneuver, may be stuck within a same path/route, etc. The ability for RA operators to support multiple AVs simultaneously can allow faster responses, more effective assistance, and reduced risk.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 5.

Figure 2:
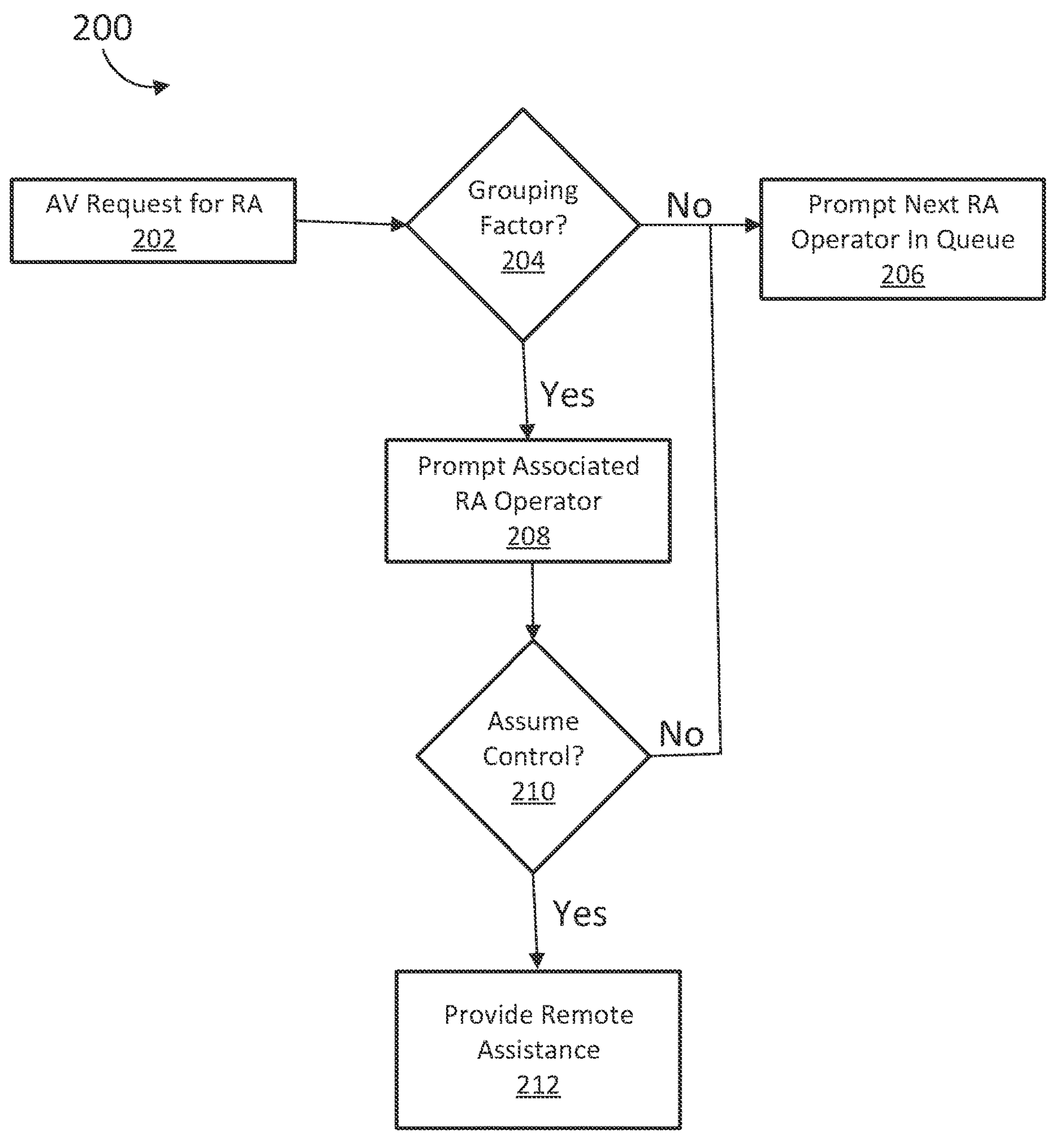
FIG. 2 illustrates a flow diagram of an example process for providing remote assistance to multiple autonomous vehicles, according to some examples of the present disclosure.

FIG. 2 illustrates a flow diagram of an example process 200 for providing remote assistance to multiple AVs. At block 202, the process 200 can include receiving, from an AV (e.g., AV 102), a request for remote assistance. For example, AV 102 can generate an assistance request, which can be accessed by a remote assistance operator via the remote assistance platform 158 discussed above with reference to FIG. 1. AV 102 can request remote assistance when it encounters a state and/or condition configured to trigger a remote assistance request, such as a stuck state resulting from any reason, including but not limited to software and/or hardware malfunctions, encountering an unknown object, being unable to autonomously complete a maneuver, being unable to navigate a scene without human assistance, being unable to continue a route without human assistance, etc. In some examples, AV 102's request for remote assistance can be communicated automatically based on one or more predefined parameters, conditions, states, contexts, and/or rules. In other examples, a passenger riding in AV 102 can manually request remote assistance. In still other examples, a remote assistance operator can proactively provide remote assistance to AV 102 based on indications that the AV 102 likely needs assistance. For example, an AV that has been stationary at a certain type of location/area for an unexpectedly long period of time may require remote assistance.

At block 204, the process 200 can include determining if there are one or more grouping factors associated with the AV (e.g., AV 102) requesting remote assistance and one or more other AVs requesting remote assistance. The one or more grouping factors can include any factor, cue, attribute, condition, context, and/or property that can be used to assign assistance requests from multiple AVs to a same remote operator so that the remote operator can assist multiple AVs, or otherwise determine that a same remote operator should handle the assistance requests from the multiple AVs (e.g., should provide assistance to the multiple AVs simultaneously or at least assigned to handle multiple remote assistance requests from separate AVs in at least partially overlapping time periods (i.e., the same remote assistance operator concurrently is assigned multiple remote assistance requests from separate AVs)). In some cases, a grouping factor can include a common factor between multiple AVs requesting assistance. For example, a common factor used as a grouping factor can include a geographic area. Here, the process 200 can determine that the AV requesting assistance and the one or more AVs requesting assistance are located and/or operating in a same geographic area (e.g., within a proximity to each other (e.g., within a predefined threshold distance), within a geofence, etc.). In some embodiments, the proximity is based on the environment of the AVs (e.g., a proximity threshold for AVs in a suburb or less dense/busy environment maybe greater than a proximity threshold in a city or more dense/busy environment). In some examples, a grouping factor can include a projected path of the AVs requesting assistance, such as whether the AVs are located on a same lane or road, or if the AVs are projected to cross paths (e.g., based on a last path before the AVs stopped). Other examples of a grouping factor can include a cause or trigger for the assistance requests (e.g., stalled or disabled AVs, damaged AVs, etc.), a type of scene associated with the AVs (e.g., parking lot, parking garage, construction zone, etc.), a context associated with the AVs (e.g., event pick-up/drop-off, airport pick-up/drop-off, etc.), a maneuver that the AVs need to perform or complete (e.g., U-turn, K-turn, reversal, fast acceleration, etc.), etc. A grouping factor can include any reason that it would be preferable to provide a same remote assistance operator control to the AV requesting remote assistance (e.g., AV 102) and one or more other AVs also requesting remote assistance, allow the same remote operator access to remote assistance requests from multiple AVs, and/or assign remote assistance requests from multiple AVs to the same remote assistance operator.

If it is determined that the AV requesting remote assistance (e.g., AV 102) is not associated with any grouping factors, then at block 206, the process 200 can include adding the AV requesting remote assistance (e.g., AV 102) to a queue for a next available remote assistance operator (or assigning the AV to an available remote assistance operator). In some examples, the remote assistance platform can display, for the remote assistance operator, a view and/or map of the area where the AV requesting remote assistance (e.g., AV 102) is located (and, optionally, any other AVs in the area and/or within a proximity to the AV). In some examples, the remote assistance operator can interact with the remote assistance platform to provide inputs, monitor AV data, and/or access any other data provided by the remote assistance platform. For example, the remote assistance operator can click/select on an AV within a map presented by the remote assistance platform, to provide assistance to that AV. AVs shown in the remote assistance map display can be displayed with certain attributes/properties to indicate certain conditions or properties of the AVs. For example, AVs in the remote assistance map display can be color coded (e.g., green for an operational AV, yellow for an AV talking to an operator, and red for an AV requesting remote assistance) to indicate states associated with the AVs. As another example, the AVs in the remote assistance map display can be displayed with different characteristics, such as different patterns, different labels, different symbols, different identifiers, different rendering patterns/characteristics (e.g., flashing, not flashing, etc.), and/or any other attributes, in order to convey different information about the AVs such as, for example, different states of the AVs (e.g., failure/error state, maneuver error, navigation error, scene element detection error or perception error, type of stuck state, etc.), different conditions, different types of assistance needs (e.g., need assistance completing a maneuver, need assistance navigating a particular scene or scene element, need assistance parking, need assistance unparking, need assistance recovering from a stuck state in a particular scene such as an intersection, need assistance with a merge, need assistance rerouting, need assistance with a lane change, etc.). Further, the map can also indicate which AV the remote assistance operator is currently assisting.

The remote assistance platform can also generate a rendering and/or graphical user interface (GUI) containing other type of data in addition to or instead of the map display described above, which a remote assistance operator can use to monitor one or more AVs, control one or more AVs, provide instructions to one or more AVs, access AV assistance requests, access AV data, etc. For example, the remote assistance platform can generate a GUI that displays a scene of one or more AVs based on sensor data from the one or more AVs (e.g., camera data, LIDAR data, RADAR data, etc.). As another example, the GUI can additionally or alternatively include log data from one or more AVs, planning data from the one or more AVs, state information from the one or more AVs, information about one or more AV assistance requests, input controls for controlling one or more AVs and/or providing instructions to one or more AVs, input controls for selecting or deselecting one or more AVs, input controls for providing other types of inputs, a rendering of one or more AVs, etc.

If it is determined that the AV requesting remote assistance (e.g., AV 102) and the one or more other AVs are associated with the one or more grouping factors, at block 208, the process 200 can determine that the remote assistance requests from the AV and the one or more other AVs associated with the one or more grouping factors can be handled by a same remote assistance operator. The process 200 can use the one or more grouping factors associated with the AV and the one or more other AVs to determine that the remote assistance requests (e.g., and thus the associated AVs) should or can be handled by a same remote assistance operator, rather than separate remote assistance operators. For example, if the one or more grouping factors include a relative area/proximity of the AVs and actions needed by the AVs (and/or dependencies for the A Vs to complete their respective actions such as an AV needing a leading AV to move forward or move out of a path for the AV to continue along that path), the process 200 can determine that such AVs can be assisted by the same remote assistance operator based on the relative area/proximity of the AVs and the actions needed by the AVs (and/or dependencies).

In some examples, two requests in a queue that have not been assigned may be grouped for assignment (e.g., a first request enters a queue and it is first determined that the request should not be grouped with any other requests; however, after a second request is received and/or enters the queue, it is determined that the first and second requests should be grouped). In this example, the first and second requests can be merged or associated in the queue. In other examples, the first and second requests can be placed into a second queue to wait for assignment. In another case, when an advisor is handling a first request (or a group of requests), and a second request is received that is determined to be combined with the first request (or group), the second request can skip any queue and be directly assigned (or offered for assignment) to the advisor. In the cases in which requests are combined and put in a queue, these combined requests can be given priority (e.g., top of the queue, assigned to senior advisor, etc.).

In some cases, the process 200 can send and/or assign the remote assistance requests (and/or associated AVs) to a remote assistance operator. In other cases, the process 200 can be prompted to add the AVs to that remote assistance operator's AV assistance queue. For example, if a remote assistance operator is assisting one or more AVs located outside a venue at the conclusion of an event (e.g., concert, etc.), and another AV in the same geographic area also requests remote assistance (e.g., AV 102), the process 200 can prompt that same remote assistance operator to add those AVs to the remote assistance operator's queue of AVs to assist. In some examples, an indication of the AVs needing assistance can appear on the GUI (e.g., on a map displayed in the GUI, etc.) that the remote assistance operator is viewing and the remote assistance operator can accept or reject a prompt and/or option to add such AVs to the AV queue of that remote assistance operator. Each of the AVs in the remote assistance operator's AV queue can be displayed with an indication that this particular remote assistance operator has assumed control of them. These indications can be presented on that remote assistance operator's display (e.g., GUI) and/or any other displays of any other remote assistance operators.

At block 210, the process 200 can include providing the remote assistance requests from the AV and the one or more other AVs associated with the one or more grouping factors to the remote assistance operator. In some cases, providing the remote assistance requests to the remote assistance operator can include automatically assigning the remote assistance requests to the remote assistance operator based on a determination that the AVs that generated the remote assistance requests are associated with the one or more grouping factors. In some cases, providing the remote assistance requests to the remote assistance operator can include adding the remote assistance requests (and/or the associated AVs) to a queue of the remote assistance operator. In some examples, the process 200 (e.g., the remote assistance operator platform) can present the remote assistance requests (and any associated data), the AVs associated with the remote assistance requests, and/or other data about the AVs and associated assistance needs and/or contexts in a GUI used by the remote assistance operator to monitor, analyze, and/or interact with such information. In some aspects, the remote assistance operator can take control of the AVs associated with the remote assistance requests (and the one or more grouping factors).

Figure 6:
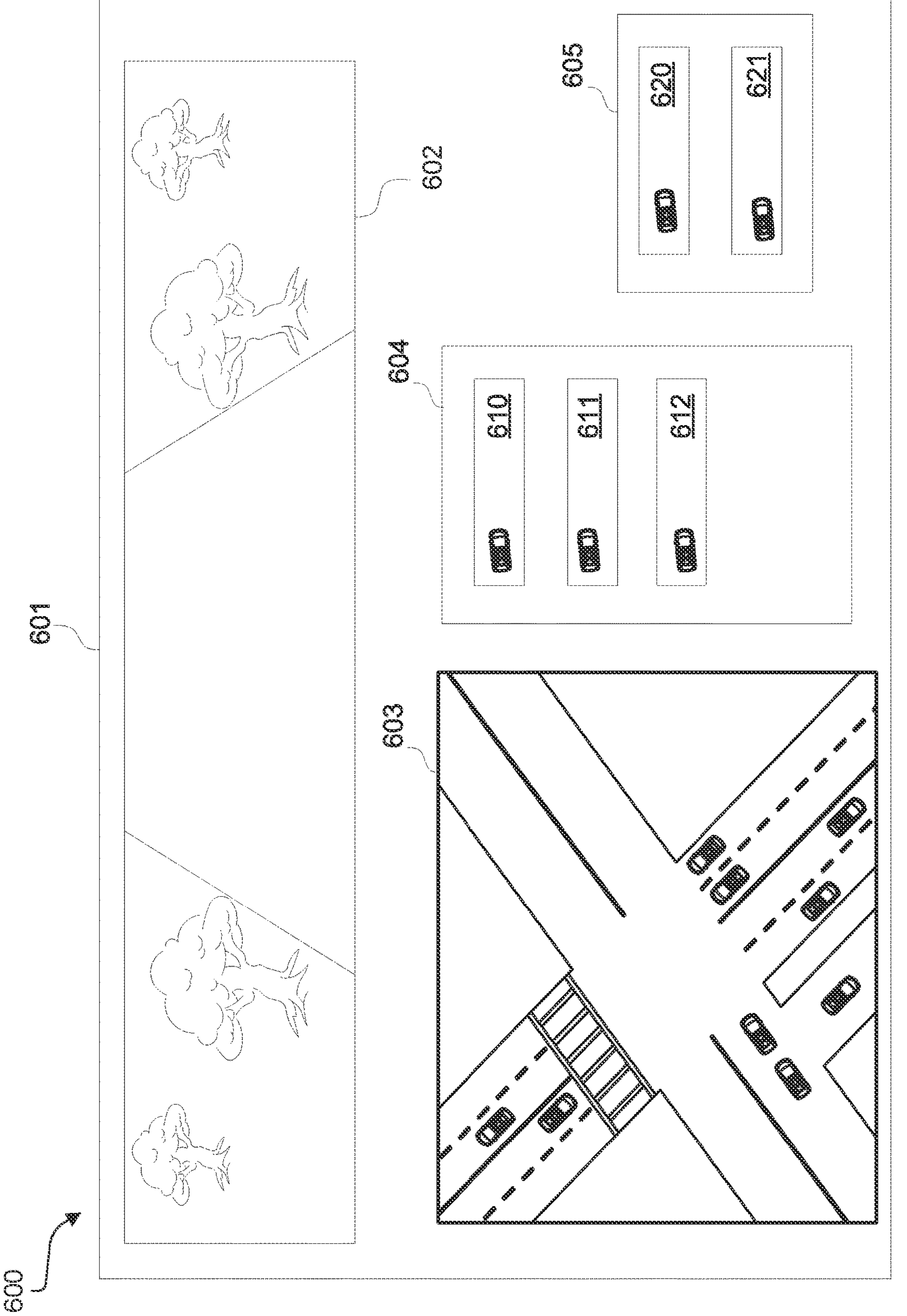
FIG. 6 illustrates an example system environment of a graphical user interface (GUI) on a remote assistance, according to some aspects of the disclosed technology.

An example GUI for a remote assistance operator is shown in FIG. 6. FIG. 6 illustrates an example system environment 600 of a graphical user interface (GUI) 601 on a remote assistance system comprising a queue 604 of AVs assigned to (or previously selected by) the remote assistance operator (e.g., AV 610, AV 611, and AV 612) for control. For example, the remote assistance operator can engage and interact with GUI 601 to communicate commands to the top AV (e.g., AV 610) in queue 604. By way of example, GUI 201 includes a front view 602 which may represent the view from AV 610 (e.g., front view 602 is from the perspective through the front windshield of AV 610). In some implementations, GUI 601 can also include a rear view perspective of AV 610. In some implementations, GUI 601 can also include a map view 603 of the environment around the selected AV (e.g., AV 610) to assist the remote assistance operator. The remote assistance operator can engage with GUI 601 to select any AV within queue 604 (e.g., AV 610, AV 611, or AV 612) to communicate commands. A second queue 605 can include one or more AVs (e.g., AV 620 and AV 621) that have been determined to be grouped with the AVs in queue 604. In some examples, the remote assistance operator can engage and interact with GUI 601 to select one or more AV's within queue 605 (e.g., AV 620 and/or AV 621) to be added to queue 604. AVs added to queue 604 can be controlled by the remote assistance operator through engagement with GUI 601.

In some examples, the remote assistance operator or the remote assistance platform used to provide the remote assistance requests and associated information (e.g., the GUI, etc.) to the remote assistance operator can determine a sequence of actions that can or should be taken to address/remedy the remote assistance requests (e.g., and the remote assistance needs of the AVs). The sequence of actions can depend on the scene(s) associated with the AVs receiving assistance, the context(s) of the AVs receiving assistance, the maneuvers determined to resolve the assistance needs of the AVs, traffic rules associated with the scene(s) associated with the AVs, one or more conditions and/or events in a scene determined based on sensor data from one or more of the AVs, and/or any other considerations for resolving the states of the AVs that caused the remote assistance requests. In some aspects, the sequence of actions for addressing/remedying the remote assistance requests (e.g., and the remote assistance needs of the AVs) can include an order of actions taken by the AVs based on a determination of what order of actions by the AVs would efficiently (or most efficiently) resolve the remote assistance issues of the AVs, any dependencies of the AVs with respect to each other and/or other scene elements or vehicles.

For example, the remote assistance operator or the process 200 (e.g., the remote assistance operator platform) can determine that a first AV should perform a maneuver(s) needed by the first AV to resolve its remote assistance issues and such maneuver(s) by the first AV should be performed before a second AV can perform a maneuver(s) needed by the second AV to resolve its remote assistance issues. Similarly, the remote assistance operator or the process 200 (e.g., the remote assistance operator platform) can determine that the second AV should perform its maneuver(s) before a third AV can perform a maneuver(s) needed by the third AV to resolve its remote assistance issues, and so forth. The remote assistance operator can coordinate (e.g., by sending instructions to the AVs and/or remotely controlling the AVs) such sequence of actions (e.g., the maneuver(s) by the first AV, followed by the maneuver(s) by the second AV, followed by the maneuver(s) of the third AV, etc.) so the AVs (e.g., the first AV, the second AV, and the third AV) perform their respective maneuvers according to the sequence of actions. A dependency of an action by a first AV on an action by a second AV can mean that the second AV needs to perform or complete respective action (and/or at least partly resolve its remote assistance issue) before the first AV can perform or complete a respective action (and/or at least partly resolve its remote assistance issue). In this scenario, the remote assistance operator can first provide remote assistance to the second AV to assist the second AV in performing or completing its respective action, and subsequently provide remote assistance to the first AV to assist the first AV in performing or completing its respective action.

For example, if an AV is a leading AV relative to another AV (e.g., is in front of the other AV) and needs to egress an area before the other AV behind the leading AV can egress the area, the leading AV's action of egressing the area can be a dependency of the other AV. Thus, the remote assistance operator can first assist (e.g., by sending instructions and/or taking remote control of the leading AV) the leading AV in egressing the area, and subsequently assist (e.g., by sending instructions and/or taking remote control of the other AV) the other AV in egressing the area. In some cases, the process 200 (e.g., the remote assistance platform) can provide the remote assistance operator an indication (e.g., via the GUI) of what actions are needed to resolve the remote assistance issues of the AVs (e.g., what action(s) should be implemented by each AV) and optionally an order/sequence in which such actions should be implemented (e.g., each AV can perform a respective action(s) according to a sequence of actions between the AVs being assisted by the remote assistance operator).

In some cases, the process 200 (e.g., the remote assistance platform) can provide the remote assistance operator (e.g., via the GUI) any information available about the AVs receiving remote assistance, the scene(s) and/or context(s) of the AVs, states of the AVs, planning information from the AVs, log data from the AVs, sensor data from the AVs, map information, remote assistance data (e.g., remote assistance requests, remote assistance needs, remote assistance causes, etc.), and/or any other data that the remote assistance operator can use to understand the scene(s) of the AVs, the needs and states of the AVs, and how to assist the AVs. For example, the process 200 (e.g., the remote assistance platform) can provide the remote assistance operator (e.g., via the GUI) a map of an area(s) of the AVs, a depiction of the AVs and/or a scene(s) of the AVs generated based on sensor data from the AVs (e.g., camera data, LIDAR data, RADAR data, accelerometer data, acoustic data, time-of-flight data, etc.), one or more controls for controlling the AVs, one or more input options for providing instructions to the AVs and/or interacting with the AVs, suggestions with information on how to assist the AVs, a view(s) from one or more of the AVs, scene data, etc.

In some cases, if the AVs associated with the one or more grouping factors are assigned to the remote assistance operator, added to the queue of the remote assistance operator, and/or selected by the remote assistance operator (e.g., if the remote assistance operator selects or accepts to provide assistance to the AVs), the process 200 (e.g., the remote assistance platform) can lock controls (and/or control/assistance capabilities) to those AVs for other remote assistance operators with access to the remote assistance platform. This way, the other remote assistance operators cannot provide instructions to those AVs or take control of those AVs while the remote assistance operator is in control of those AVs, is attempting to control those AVs, has sent or is sending instructions to those AVs, is preparing to or assisting those AVs, and/or has accepted to assist those AVs. This can prevent conflicting controls and/or instructions provided to the AVs, confusion and/or errors in assisting the AVs, and other issues/conflicts. In some examples, if the AVs associated with the one or more grouping factors are assigned to the remote assistance operator, added to the queue of the remote assistance operator, and/or selected by the remote assistance operator (e.g., if the remote assistance operator selects or accepts to provide assistance to the AVs), the process 200 (e.g., the remote assistance platform) can remove any or all access (e.g., via the GUI) to those AVs (and/or the associated assistance requests) by one or more other remote assistance operators. For example, the process 200 (e.g., the remote assistance platform) can prevent another remote assistance operator from seeing the remote assistance requests of those AVs and attempting to add them to a queue of that other remote assistance operator. In other examples, the process 200 (e.g., the remote assistance platform) can allow other remote assistance operators to see the AVs and/or the associated remote assistance requests, but may provide an indication (e.g., a label, a note, an attribute of a rendering of the AVs such as a color and/or pattern, queue and/or remote assistance statuses and/or activity, etc.) informing those remote assistance operators that the AVs and the associated remote assistance requests are assigned to and/or being handled (or selected to by handled) by the remote assistance operator.

In some cases, the remote assistance operator may determine that it would be helpful to assume control of the AVs associated with the one or more grouping factors in order to resolve an issue with the AVs, such as a gridlock, for example. In some examples, the remote assistance operator can also determine that it would be helpful to control another AV in the environment that is currently being assisted by a different remote assistance operator, and can request control from the other remote assistance operator. The other remote assistance operator can accept or reject the request. If the request is accepted, the remote assistance operator associated with the request can assume control of that other AV, can add that other AV to its queue, can assist that other AV as part of a plan (e.g., a sequence of actions) for assisting the other AVs associated with the one or more grouping factors. In some examples, the remote assistance operator can also determine that it would be helpful to control another AV in the environment that is not being assisted remotely, and can proactively assume control of the AV to resolve an assistance need/issue, such as a traffic issue. In general, remote assistance operators can have the ability to see AVs in a given environment, the statuses of the AVs, which remote assistance operator has control of an AV, etc. Moreover, remote assistance operators can have the ability to request to take control of any AV in the environment.

In some examples, once the AVs associated with the one or more grouping factors have been added to the remote assistance operator's queue, the process 200 can provide (e.g., via the GUI) some indication that the AVs are in the queue of the remote assistance operator to other remote assistance operators. In some cases, the process 200 can provide such indication on a map presented to the other remote assistance operators. In some examples, once the AVs associated with the one or more grouping factors have been added to the remote assistance operator's queue, the remote assistance operator can provide an input (e.g., click on an AV such as AV 102 or otherwise select the AV) in a map view (and/or a scene view) to assume control of that AV. If the remote assistance operator determines not to provide assistance to an AV (and/or accept an assignment of the AV) and/or determines that it is not helpful to assume control of the AV, the request for remote assistance can be delivered to another remote assistance operator, such as the next available remote assistance operator or a remote assistance operator assisting other AVs in the scene of the AV and/or within a proximity to that AV. The remote assistance operator, however, can request control of the AV at a later time if the operator changes their mind.

In some examples, remote assistance operators can be ranked based on their experience or skill level. Remote assistance operators above a certain threshold level of experience can be permitted control of multiple AVs during remote assistance sessions, while remote assistance operators below a certain threshold level of experience may not be permitted control of multiple AVs during remote assistance sessions until they have achieved a certain level of experience. In some examples, remote assistance operators can click on or select multiple AVs that they wish to control, or remote assistance operators can drag over an area of the GUI (e.g., a map, a scene, etc.) to select a set of AVs in a specific geographic area. In some examples, the process 200 can recommend to a remote assistance operator to take control of an AV (even if the AV has not requested remote assistance). Moreover, the process 200 can request that a remote assistance operator relinquish control of an AV. Multiple AVs can be assigned to single remote assistance operator as a batch or in any particular order or form.

In the scenario where a remote assistance operator has assumed control of more than one AV, the remote assistance operator's display can include a view of all (or partial) camera feeds and other sensor data of all of the AVs under the remote assistance operator's control. For example, a camera mounted on a first AV may be occluded from detecting an object that a camera mounted on a second AV can detect. It can be helpful for the remote assistance operator to have access to all the camera and sensor data in order to diagnose and resolve problems. In some examples, a subset of camera feeds can be displayed and the process 200 can determine which camera feeds to display based on the context of a situation. For example, front camera feeds can be prioritized when the AV is travelling forward, while side camera feeds can be prioritized when the AV is turning (or planning to turn). In some cases, the remote assistance operator can explicitly choose which cameras to display. In some aspects, the process 200 can fuse sensor data (e.g., camera data, LIDAR data, RADAR data, acoustic data, etc.) from the AVs associated with the one or more grouping factors, to provide the remote assistance operator (e.g., via the GUI) more detailed and/or complete information about the AVs and their context, and/or to provide a more detailed and/or complete view of the scene(s) associated with the AVs.

At block 212, the process 200 can include providing remote assistance to the AV and the AVs associated with the one or more grouping factors (e.g., the AVs assigned to that remote assistance operator). For example, the remote assistance operator can provide assistance to the AVs via the GUI, as previously explained. The remote assistance operator can send instructions/commands to the AVs, control the AVs, interact with the AVs, receive data from the AVs, and/or perform any other action to assist the AVs. The process 200 (e.g., via the remote assistance platform) can display information about each or all of the AVs, which the remote assistance operator can use to understand the state of the AVs and associated issues, determine how to assist the AVs, etc.

In some examples, the remote assistance operator's display can include projected planned paths of the AVs on the map to help the remote assistance operator determine the best route for a given AV on the map. The optimal size of the geographic area for which multiple AVs can be assigned to a single remote assistance operator can change depending on circumstances. For example, during a street festival there can be multiple AVs attempting to pick up passengers and requesting remote assistance in a three-block area. In some contexts, a three block area can be small enough to group all or multiple AVs in the area. However, in this situation, perhaps each block has a unique problem associated with the block (for example, one block is closed to traffic for people to stroll, one block is closed by an emergency vehicle due to a medical emergency, and one block is closed due to a car accident). Therefore, in some cases, although some of the AVs requesting remote assistance may only be one or two blocks apart, it may be more efficient to group the AVs for remote assistance based on the specific block (rather than more than one block) due to the unique issues encountered with each block. This grouping can be done automatically by the system, or manually by remote assistance operators.

In some examples, a remote assistance operator can paint a path on the display indicating to other remote assistance operators a path that other AVs can follow to resolve gridlock or other issues. Alternatively, a remote assistance operator can paint a path on the display indicating a path that AVs should avoid in order to resolve the issue. In some cases, a plurality of AVs located in a single geographic area can overwhelm cellular towers. Remote assistance operators can turn off cellular connections to AVs under their control that they are not actively controlling in order to better conserve cellular bandwidth.

Figure 3:
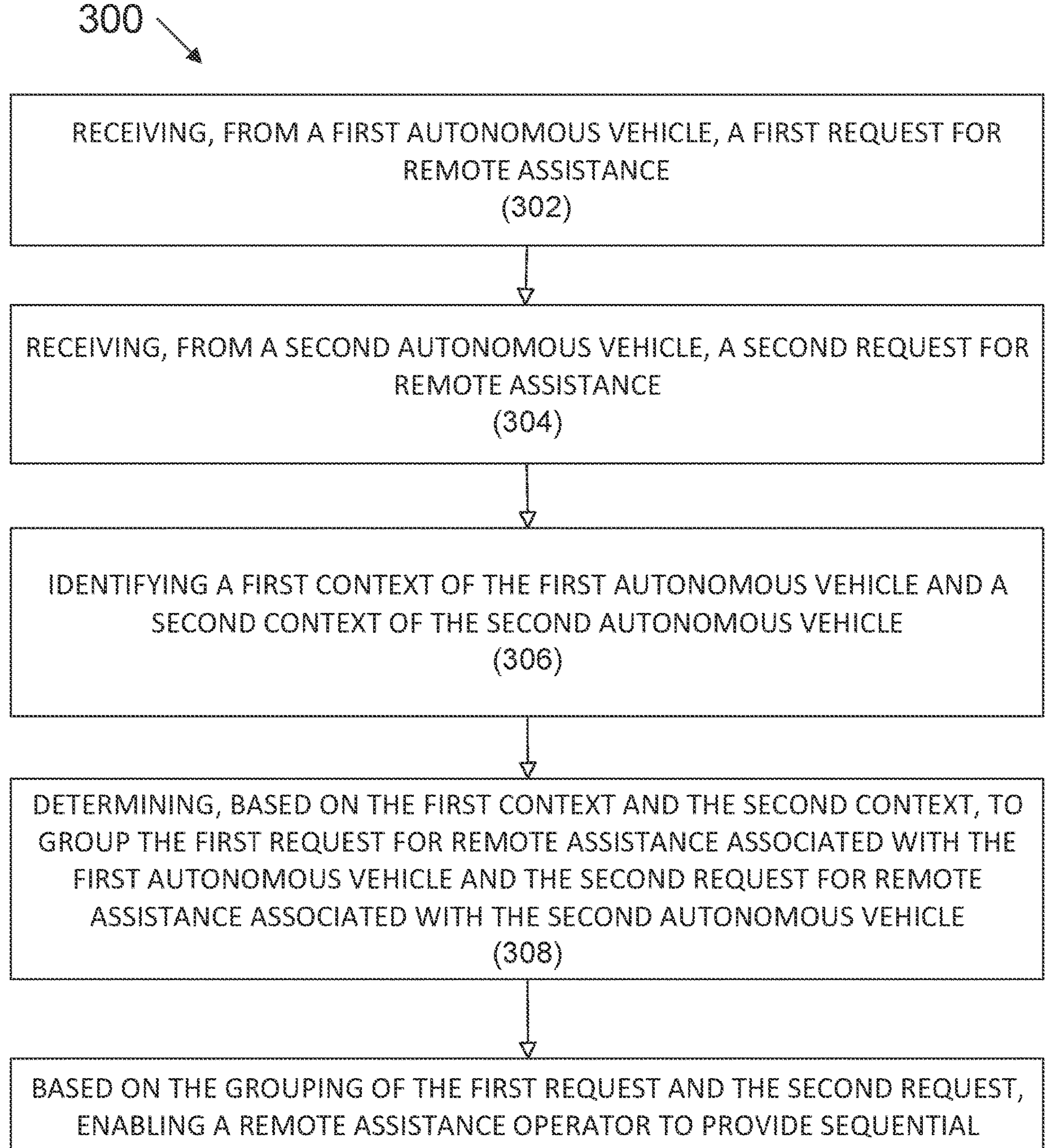
FIG. 3 illustrates a flow diagram of an example process for enabling a remote assistance operator to remotely assist multiple autonomous vehicles, according to some examples of the present disclosure.

FIG. 3 illustrates a flow diagram of an example process 300 for enabling a remote assistance operator to provide remote assistance to multiple AVs. At block 302, the process 300 can include receiving, from a first autonomous vehicle (e.g., AV 102), a first request for remote assistance. For example, AV 102 can become stuck and request remote assistance when unable to autonomously proceed and/or complete a maneuver. In some cases, AV 102 can request remote assistance when it is stuck and/or needs human assistance for any reason, including but not limited to software and/or hardware malfunctions, encountering an unknown object, experiencing a navigation error, etc. In some examples, AV 102's request for remote assistance can be communicated automatically based on predefined parameters. In other examples, a passenger riding in AV 102 can manually request remote assistance. In still other examples, a remote assistance operator can proactively provide remote assistance to AV 102 based on indications that the AV 102 likely needs assistance. For example, an AV that has been stationary for an unexpectedly long period of time (e.g., a time above a threshold) may be identified as needing remote assistance if such AV is otherwise expected to move faster than the unexpectedly long period of time given a context of the AV.

At block 304, the process 300 can include receiving, from a second autonomous vehicle (AV), a second request for remote assistance. In some examples, the second AV can request remote assistance for the same (or similar) reasons and in the same (or similar) manner as described above with respect to the first AV (e.g., AV 102). At block 306, the process 300 can include identifying a first context of the first autonomous vehicle (e.g., AV 102) and a second context of the second autonomous vehicle (AV). The first and second context can include, for example and without limitation, respective locations of the first and second AVs, respective states of the first and second AVs, one or more scenes of the first and second AVs, one or more conditions associated with the first and second AVs, one or more assistance needs associated with the first and second AVs, one or more triggers for the remote assistance needs and/or requests associated with the first and second AVs, planning and/or routing information associated with the first and second AVs, capabilities (e.g., software capabilities, hardware capabilities, maneuver capabilities, navigation/operation capabilities, perception capabilities, autonomous capabilities, etc.) of the first and second AVs, one or more operating constraints of the first and second AVs, traffic rules associated with a scene(s) of the first and second AVs, and/or any other relevant information pertaining to the remote assistance requests and/or the first and second AVs.

In some examples, the process 300 can display information about the AVs and/or the associated contexts in a display of one or more remote assistance operators. For example, the process 300 can display AVs in a remote assistance map. The AVs in the display can be color coded (e.g., green for an operational AV, yellow for an AV talking to an operator, and red for an AV requesting remote assistance) and/or otherwise depicted based on one or more attributes and/or patterns to indicate information about the AVs, such as the first and second contexts.

In some examples, the first and second context can include (or be the same as) one or more grouping factors, as previously described. In some cases, the one or more grouping factors can include (or be the same as) the first and second context. Thus, the first and second context can be used to group the first and second requests (and/or the first and second AVs associated with the first and second requests) for assistance by a same remote assistance operator.

At block 308, the process 300 can include determining, based on the first context and the second context, to group the first request for remote assistance associated with the first autonomous vehicle and the second request for remote assistance associated with the second autonomous vehicle. The process 300 can group the first request and second request for potential assignment to and/or assistance by a same remote assistance operator (e.g., rather than separate remote assistance operators providing assistance to the AVs). The process 300 can group the first request and second request based on a match or similarity between the first and second context, a similarly or match in assistance needs associated with the first and second contexts, a dependency of actions by the first and second AVs in (and/or given) the first and second context, a similarity and/or match between actions that can be performed by the first and second AVs to address or resolve a remote assistance issue(s) associated with the first and second context, and/or any other information about the first and second context that can indicate a need, capability, or preference for having a same remote assistance operator assist both the first and second AV.

For example, if the first and second context indicate that the first and second AVs experienced an error event (e.g., a remote assistance triggering event) within a geographic area and/or a proximity to each other, the process 300 can group the first and second AVs for assistance from a same remote assistance operator. In some examples, the process 300 can also group other AVs with the first and second AVs. For example, if a context of one or more additional AVs indicates that the one or more additional AVs are operating in a same geographic area as the first and second AVs and the one or more additional AVs need remote assistance and/or have requested remote assistance, the process 300 can group the one or more additional AVs with the first and second AVs.

In some cases, the first context can include a first path and the second context can include a second path, and determining to group the first request and the second request can be based on a determination that the first path intersects the second path. In other cases, the first context can additionally or alternatively include a first location and the second context can additionally or alternatively include a second location, and determining to group the first request and the second request can be additionally or alternatively based on a determination that a distance between the first location and the second location is less than a threshold distance.

At block 310, the process 300 can include enabling, based on the grouping of the first request and the second request, a remote assistance operator to provide sequential assistance to the first autonomous vehicle associated with the first request for remote assistance and the second autonomous vehicle associated with the second request for remote assistance.

In some aspects, enabling the remote assistance operator to provide sequential assistance to the first autonomous vehicle and the second autonomous vehicle can include providing, to a device associated with the remote assistance operator, a user interface that allows the remote assistance operator to select or activate an interface element representing the first autonomous vehicle and/or the second autonomous vehicle on an interface to exert control of the first autonomous vehicle and/or the second autonomous vehicle. In some aspects, enabling the remote assistance operator to provide sequential assistance to the first autonomous vehicle and the second autonomous vehicle can include providing parallel assistance to the first autonomous vehicle and the second autonomous vehicle.

In some aspects, enabling the remote assistance operator to provide sequential assistance to the first autonomous vehicle and the second autonomous vehicle can include providing, to a device associated with the remote assistance operator, a user interface that include one or more input options configured to allow the remote assistance operator to provide instructions to the first autonomous vehicle and the second autonomous vehicle and/or control the first autonomous vehicle and the second autonomous vehicle. In some examples, the user interface can include one or more indications that the first autonomous vehicle and the second autonomous vehicle requested remote assistance.

In some aspects, the process 300 can include providing, to a device associated with the remote assistance operator, a user interface that includes one or more input options configured to allow the remote assistance operator to assert control over a third autonomous vehicle by activating an interface element (e.g., an icon, a button, a field, etc.) associated with the third autonomous vehicle.

In some aspects, the process 300 can include displaying at least one camera feed from at least one of the first autonomous vehicle and the second autonomous vehicle.

In some aspects, the process 300 can present, on a display, a map depicting the first AV and/or the second AV, a scene of the first AV and/or the second AV, a respective route/path of the first AV and/or the second AV, and/or other information. In some examples, the map can indicate which (if any) AVs a particular remote assistance operator is assisting. In some examples, the remote assistance operator's display can include projected planned paths of the AVs on the map to help the remote assistance operator determine the best route for a given AV on the map.

In some examples, enabling the remote assistance operator to provide the sequential assistance can include communicating both the first request for remote assistance and the second request for remote assistance to the remote assistance operator to provide sequential assistance. In some cases, the remote assistance operator may determine that it would be helpful to assume control of AV 102 (in addition to control of the other AVs) in order to resolve an issue, for example. In some examples, the remote assistance operator can also determine that it would be helpful to control another AV in the environment that is currently being assisted by a different remote assistance operator, and can request control from the other remote assistance operator. In some examples, the remote assistance operator can also determine that it would be helpful to control another AV in the environment that is not being assisted remotely, and can proactively assume control of the AV to resolve a traffic issue. In general, all remote assistance operators can have the ability to see all AVs in a given environment, see the statuses of the AVs, see which remote assistance operator has control of an AV, and request to take control of any AV in the environment. In this scenario, if the remote assistance operator determines that it would be helpful for them to add AV 102 to their AV queue, AV 102 is added to the remote assistance operator's queue. Once AV 102 has been added to the remote assistance operator's queue, some indication of such can appear on the map for all remote assistance operators. Additionally, once AV 102 has been added to the remote assistance operator's queue, the remote assistance operator can click on the AV 102 in the map view to assume control.

Figure 4:
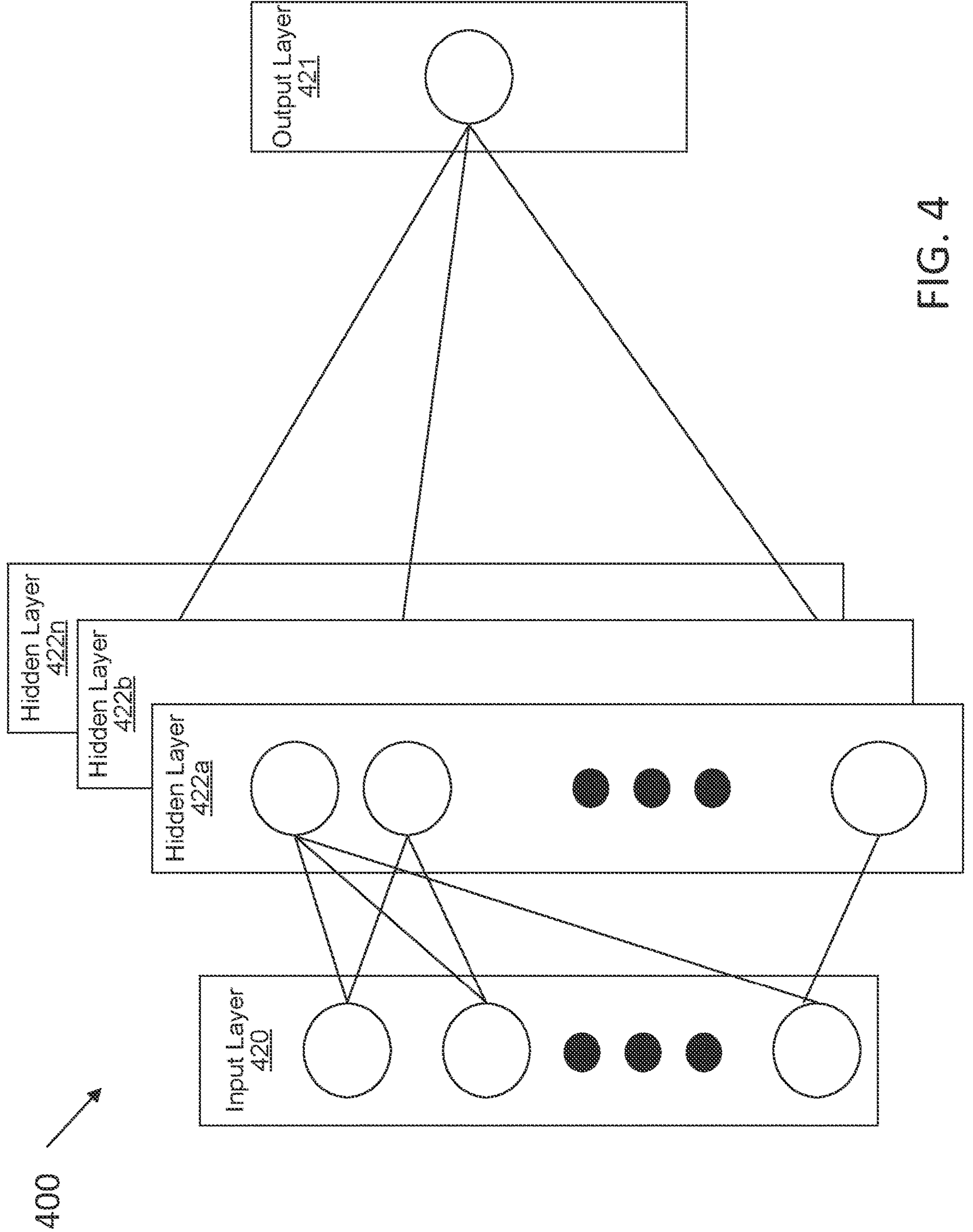
FIG. 4 illustrates an example of a deep learning neural network that can be used to implement sequential remote assistance, according to some aspects of the disclosed technology.

In FIG. 4, the disclosure now turns to a further discussion of models that can be used through the environments and techniques described herein. FIG. 4 is an example of a deep learning neural network 400 that can be used to implement all or a portion of the systems and techniques described herein (e.g., neural network 400 can be used to implement a model for determining, whether there is a trigger associated with the first autonomous vehicle and the second autonomous vehicle, as discussed above). An input layer 420 can be configured to receive trigger data and/or data relating to an environment surrounding an AV. Neural network 400 includes multiple hidden layers 422*a*, 422*b*, through 422*n*. The hidden layers 422*a*, 422*b*, through 422*n* include "n" number of hidden layers, where "n" is an integer greater than or equal to one. The number of hidden layers can be made to include as many layers as needed for the given application. Neural network 400 further includes an output layer 421 that provides an output resulting from the processing performed by the hidden layers 422*a*, 422*b*, through 422*n*.

Neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422*a*. For example, as shown, each of the input nodes of the input layer 420 is connected to each of the nodes of the first hidden layer 422*a*. The nodes of the first hidden layer 422*a* can transform the information of each input node by applying activation functions to the input node information. The information derived from the transformation can then be passed to and can activate the nodes of the next hidden layer 422*b*, which can perform their own designated functions. Example functions include convolutional, up-sampling, data transformation, and/or any other suitable functions. The output of the hidden layer 422*b* can then activate nodes of the next hidden layer, and so on. The output of the last hidden layer 422*n* can activate one or more nodes of the output layer 421, at which an output is provided. In some cases, while nodes in the neural network 400 are shown as having multiple output lines, a node can have a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422*a*, 422*b*, through 422*n* in order to provide the output through the output layer 421.

In some cases, the neural network 400 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 400 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½ (target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 400 can perform a backward pass by determining which inputs (weights) most contributed to the loss of the network, and can adjust the weights so that the loss decreases and is eventually minimized.

The neural network 400 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 5:
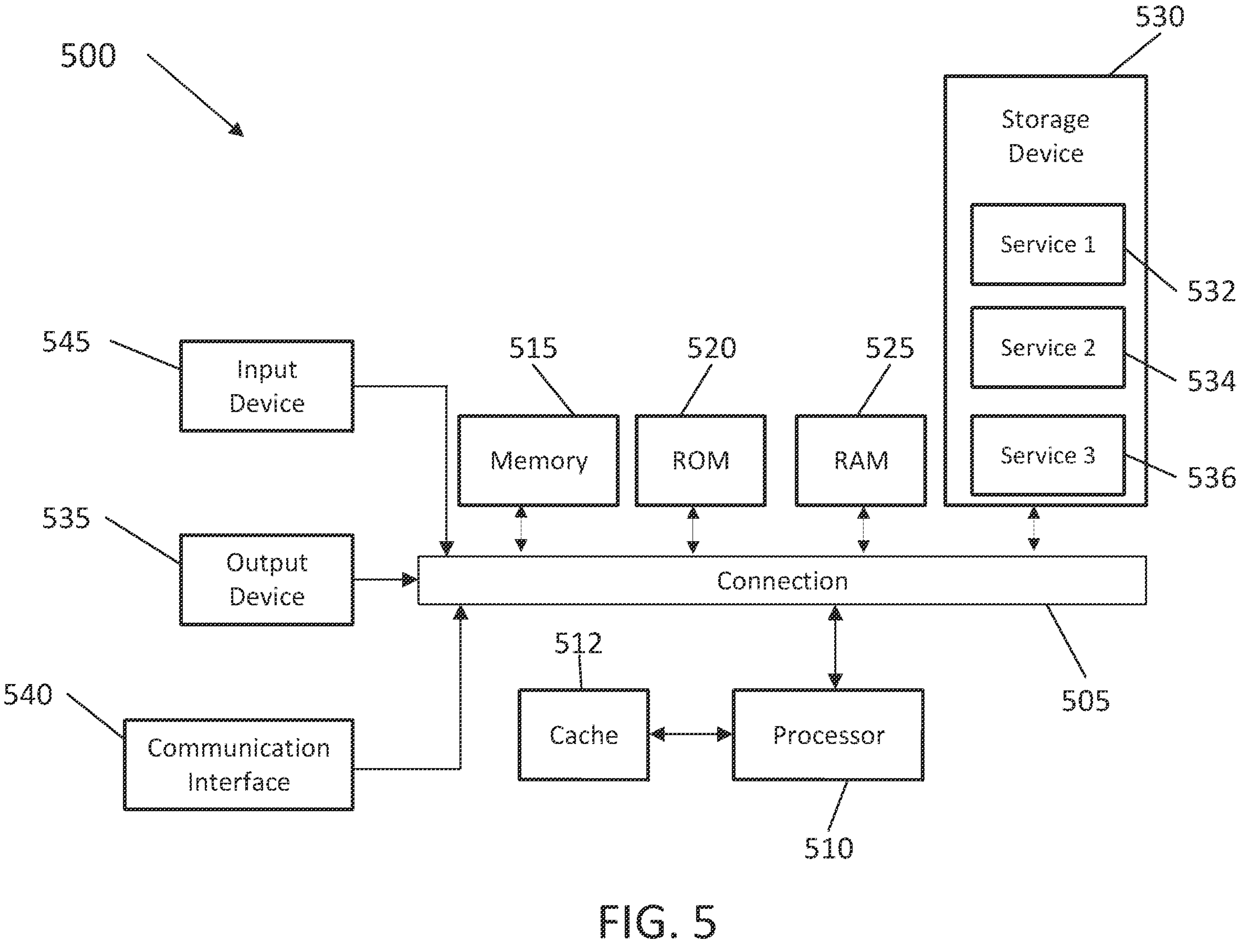
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative examples of the disclosure include:

Aspect 1. A method comprising: receiving, from a first autonomous vehicle, a first request for remote assistance; receiving, from a second autonomous vehicle, a second request for remote assistance; identifying a first context of the first autonomous vehicle and a second context of the second autonomous vehicle; determining, based on the first context and the second context, to group the first request for remote assistance associated with the first autonomous vehicle and the second request for remote assistance associated with the second autonomous vehicle; and based on the grouping of the first request and the second request, enabling a remote assistance operator to provide sequential assistance to the first autonomous vehicle associated with the first request for remote assistance and the second autonomous vehicle associated with the second request for remote assistance.

Aspect 2. The method of Aspect 1, wherein the first context comprises a first location and the second context comprises a second location, and wherein determining to group the first request and the second request is based on a determination that a distance between the first location and the second location is less than a threshold distance.

Aspect 3. The method of Aspect 1 or 2, wherein the first context comprises a first path and the second context comprises a second path, and wherein determining to group the first request and the second request is based on a determination that the first path intersects the second path.

Aspect 4. The method of any of Aspects 1 to 3, wherein enabling the remote assistance operator to provide sequential assistance to the first autonomous vehicle and the second autonomous vehicle comprises providing, to a device associated with the remote assistance operator, a user interface that allows the remote assistance operator to select or activate an interface element representing at least one of the first autonomous vehicle and the second autonomous vehicle on an interface to exert control of the at least one of the first autonomous vehicle and the second autonomous vehicle.

Aspect 5. The method of any of Aspects 1 to 4, wherein enabling the remote assistance operator to provide sequential assistance to the first autonomous vehicle and the second autonomous vehicle comprises providing, to a device associated with the remote assistance operator, a user interface comprising one or more input options configured to allow the remote assistance operator to at least one of provide instructions to the first autonomous vehicle and the second autonomous vehicle and control the first autonomous vehicle and the second autonomous vehicle, wherein the user interface includes one or more indications that the first autonomous vehicle and the second autonomous vehicle requested remote assistance.

Aspect 6. The method of any of Aspects 1 to 5, further comprising providing, to a device associated with the remote assistance operator, a user interface comprising one or more input options configured to allow the remote assistance operator to assert control over a third autonomous vehicle by activating an interface element associated with the third autonomous vehicle.

Aspect 7. The method of any of Aspects 1 to 6, further comprising displaying at least one camera feed from at least one of the first autonomous vehicle and the second autonomous vehicle.

Aspect 8. A system comprising: at least one memory; and at least one processor coupled to the at least one memory, the at least one processor configured to: receive, from a first autonomous vehicle, a first request for remote assistance; receive, from a second autonomous vehicle, a second request for remote assistance; identify a first context of the first autonomous vehicle and a second context of the second autonomous vehicle; determine, based on the first context and the second context, to group the first request for remote assistance associated with the first autonomous vehicle and the second request for remote assistance associated with the second autonomous vehicle; and based on the grouping of the first request and the second request, assign a remote assistance operator to provide sequential assistance to the first autonomous vehicle associated with the first request for remote assistance and the second autonomous vehicle associated with the second request for remote assistance.

Aspect 9. The system of Aspect 8, wherein the first context comprises a first location and the second context comprises a second location, and wherein determining to group the first request and the second request is based on a determination that a distance between the first location and the second location is less than a threshold distance.

Aspect 10. The system of Aspect 8 or 9, wherein the first context comprises a first path and the second context comprises a second path, and wherein determining to group the first request and the second request is based on a determination that the first path intersects the second path.

Aspect 11. The system of any of Aspects 8 to 10, wherein enabling the remote assistance operator to provide sequential assistance to the first autonomous vehicle and the second autonomous vehicle comprises providing, to a device associated with the remote assistance operator, a user interface that allows the remote assistance operator to select or activate an interface element representing at least one of the first autonomous vehicle and the second autonomous vehicle on an interface to exert control of the at least one of the first autonomous vehicle and the second autonomous vehicle.

Aspect 12. The system of any of Aspects 8 to 11, wherein enabling the remote assistance operator to provide sequential assistance to the first autonomous vehicle and the second autonomous vehicle comprises providing, to a device associated with the remote assistance operator, a user interface comprising one or more input options configured to allow the remote assistance operator to at least one of provide instructions to the first autonomous vehicle and the second autonomous vehicle and control the first autonomous vehicle and the second autonomous vehicle, wherein the user interface includes one or more indications that the first autonomous vehicle and the second autonomous vehicle requested remote assistance.

Aspect 13. The system of any of Aspects 8 to 12, further comprising providing, to a device associated with the remote assistance operator, a user interface comprising one or more input options configured to allow the remote assistance operator to assert control over a third autonomous vehicle by activating an interface element associated with the third autonomous vehicle.

Aspect 14. The system of any of Aspects 8 to 13, further comprising displaying at least one camera feed from at least one of the first autonomous vehicle and the second autonomous vehicle.

Aspect 15. A non-transitory computer-readable storage medium comprising at least one instruction for causing a computer or processor to: receive, from a first autonomous vehicle, a first request for remote assistance; receive, from a second autonomous vehicle, a second request for remote assistance; identify a first context of the first autonomous vehicle and a second context of the second autonomous vehicle; determine, based on the first context and the second context, to group the first request for remote assistance associated with the first autonomous vehicle and the second request for remote assistance associated with the second autonomous vehicle; and based on the grouping of the first request and the second request, enable a remote assistance operator to provide sequential assistance to the first autonomous vehicle associated with the first request for remote assistance and the second autonomous vehicle associated with the second request for remote assistance.

Aspect 16. The non-transitory computer-readable storage medium of Aspect 15, wherein the first context comprises a first location and the second context comprises a second location, and wherein determining to group the first request and the second request is based on a determination that a distance between the first location and the second location is less than a threshold distance.

Aspect 17. The non-transitory computer-readable storage medium of Aspect 15 or 16, wherein the first context comprises a first path and the second context comprises a second path, and wherein determining to group the first request and the second request is based on a determination that the first path intersects the second path.

Aspect 18. The non-transitory computer-readable storage medium of any of Aspects 15 to 17, wherein enabling the remote assistance operator to provide sequential assistance to the first autonomous vehicle and the second autonomous vehicle comprises providing, to a device associated with the remote assistance operator, a user interface that allows the remote assistance operator to select or activate an interface element representing at least one of the first autonomous vehicle and the second autonomous vehicle on an interface to exert control of the at least one of the first autonomous vehicle and the second autonomous vehicle.

Aspect 19. The non-transitory computer-readable storage medium of any of Aspects 15 to 18, wherein enabling the remote assistance operator to provide sequential assistance to the first autonomous vehicle and the second autonomous vehicle comprises providing, to a device associated with the remote assistance operator, a user interface comprising one or more input options configured to allow the remote assistance operator to at least one of provide instructions to the first autonomous vehicle and the second autonomous vehicle and control the first autonomous vehicle and the second autonomous vehicle, wherein the user interface includes one or more indications that the first autonomous vehicle and the second autonomous vehicle requested remote assistance.

Aspect 20. The non-transitory computer-readable storage medium of any of Aspects 15 to 19, further comprising providing, to a device associated with the remote assistance operator, a user interface comprising one or more input options configured to allow the remote assistance operator to assert control over a third autonomous vehicle by activating an interface element associated with the third autonomous vehicle.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A computer-implemented method comprising:

receiving, from a first autonomous vehicle, a first request for remote assistance due to a first stuck condition; receiving, from a second autonomous vehicle, a second request for remote assistance due to a second stuck condition;

identifying a first context of the first autonomous vehicle and a second context of the second autonomous vehicle;

determining a grouping factor based on the first context and the second context, to group the first request for remote assistance associated with the first autonomous vehicle and the second request for remote assistance associated with the second autonomous vehicle, the grouping factor based on a similarity between the first stuck condition and the second stuck condition, and based on a similarity between a first action determined to address the first stuck condition and a second action determined to address the second stuck condition, wherein the first context comprises a first path and the second context comprises a second path;

determining, based on the grouping factor, whether a single remote operator is capable of providing remote assistance to the first autonomous vehicle and the second autonomous vehicle based on a determination that the first path intersects the second path; and based on determining that the single remote operator is capable of providing remote assistance, enabling a remote assistance operator to provide sequential assistance to the first autonomous vehicle associated with the first request for remote assistance and the second autonomous vehicle associated with the second request for remote assistance, wherein the enabling includes providing an interface configured to display to the single remote operator a remote assistance map of an area including the first autonomous vehicle and the second autonomous vehicle and a projected path of the first autonomous vehicle and the second autonomous vehicle.

2. The computer-implemented method of claim 1, wherein the first context comprises a first location and the second context comprises a second location, and wherein determining that the single remote operator is capable of providing remote assistance is based on a determination that a distance between the first location and the second location is less than a threshold distance.

3. The computer-implemented method of claim 1, wherein the interface is configured to display a first camera feed from the first autonomous vehicle and a second camera feed from the second autonomous vehicle.

4. The computer-implemented method of claim 1, wherein enabling the remote assistance operator to provide sequential assistance to the first autonomous vehicle and the second autonomous vehicle comprises providing, to a device associated with the remote assistance operator, a user interface that allows the remote assistance operator to select or activate an interface element representing at least one of the first autonomous vehicle and the second autonomous vehicle on an interface to exert control of the at least one of the first autonomous vehicle and the second autonomous vehicle.

5. The computer-implemented method of claim 1, wherein enabling the remote assistance operator to provide sequential assistance to the first autonomous vehicle and the second autonomous vehicle comprises providing, to a device associated with the remote assistance operator, a user interface comprising one or more input options configured to allow the remote assistance operator to at least one of provide instructions to the first autonomous vehicle and the second autonomous vehicle and control the first autonomous vehicle and the second autonomous vehicle, wherein the user interface includes one or more indications that the first autonomous vehicle and the second autonomous vehicle requested remote assistance.

6. The computer-implemented method of claim 1, further comprising providing, to a device associated with the remote assistance operator, a user interface comprising one or more input options configured to allow the remote assistance operator to assert control over a third autonomous vehicle by activating an interface element associated with the third autonomous vehicle.

7. The computer-implemented method of claim 1, further comprising displaying at least one camera feed from at least one of the first autonomous vehicle and the second autonomous vehicle.

8. A system comprising:

at least one memory; and at least one processor coupled to the at least one memory, the at least one processor configured to:

receive, from a first autonomous vehicle, a first request for remote assistance due to a first stuck condition;

receive, from a second autonomous vehicle, a second request for remote assistance due to a second stuck condition;

identify a first context of the first autonomous vehicle and a second context of the second autonomous vehicle;

determine a grouping factor based on the first context and the second context, to group the first request for remote assistance associated with the first autonomous vehicle and the second request for remote assistance associated with the second autonomous vehicle, the grouping factor based on a similarity between the first stuck condition and the second stuck condition, and based on a similarity between a first action determined to address the first stuck condition and a second action determined to address the second stuck condition, wherein the first context comprises a first path and the second context comprises a second path;

determine, based on the grouping factor, whether a single remote operator is capable of providing remote assistance to the first autonomous vehicle and the second autonomous vehicle based on a determination that the first path intersects the second path; and based on determining that the single remote operator is capable of providing the remote assistance, assign a remote assistance operator to provide sequential assistance to the first autonomous vehicle associated with the first request for remote assistance and the second autonomous vehicle associated with the second request for remote assistance, and provide an interface configured to display to the single remote operator a remote assistance map of an area including the first autonomous vehicle and the second autonomous vehicle and a projected path of the first autonomous vehicle and the second autonomous vehicle.

9. The system of claim 8, wherein the first context comprises a first location and the second context comprises a second location, and wherein determining that the single remote operator is capable of providing remote assistance is based on a determination that a distance between the first location and the second location is less than a threshold distance.

10. The system of claim 8, wherein the interface is configured to display a first camera feed from the first autonomous vehicle and a second camera feed from the second autonomous vehicle.

11. The system of claim 8, wherein enabling the remote assistance operator to provide sequential assistance to the first autonomous vehicle and the second autonomous vehicle comprises providing, to a device associated with the remote assistance operator, a user interface that allows the remote assistance operator to select or activate an interface element representing at least one of the first autonomous vehicle and the second autonomous vehicle on an interface to exert control of the at least one of the first autonomous vehicle and the second autonomous vehicle.

12. The system of claim 8, wherein enabling the remote assistance operator to provide sequential assistance to the first autonomous vehicle and the second autonomous vehicle comprises providing, to a device associated with the remote assistance operator, a user interface comprising one or more input options configured to allow the remote assistance operator to at least one of provide instructions to the first autonomous vehicle and the second autonomous vehicle and control the first autonomous vehicle and the second autonomous vehicle, wherein the user interface includes one or more indications that the first autonomous vehicle and the second autonomous vehicle requested remote assistance.

13. The system of claim 8, further comprising providing, to a device associated with the remote assistance operator, a user interface comprising one or more input options configured to allow the remote assistance operator to assert control over a third autonomous vehicle by activating an interface element associated with the third autonomous vehicle.

14. The system of claim 8, further comprising displaying at least one camera feed from at least one of the first autonomous vehicle and the second autonomous vehicle.

15. Non-transitory computer-readable storage medium comprising at least one instruction for causing a computer or processor to:

receive, from a first autonomous vehicle, a first request for remote assistance due to a first stuck condition;

receive, from a second autonomous vehicle, a second request for remote assistance due to a second stuck condition;

identify a first context of the first autonomous vehicle and a second context of the second autonomous vehicle;

determine a grouping factor based on the first context and the second context, to group the first request for remote assistance associated with the first autonomous vehicle and the second request for remote assistance associated with the second autonomous vehicle, the grouping factor based on a similarity between the first stuck condition and the second stuck condition, and based on a similarity between a first action determined to address the first stuck condition and a second action determined to address the second stuck condition, wherein the first context comprises a first path and the second context comprises a second path;

determine, based on the grouping factor, whether a single remote operator is capable of providing remote assistance to the first autonomous vehicle and the second autonomous vehicle based on a determination that the first path intersects the second path; and based on determining that the single remote operator is capable of providing the remote assistance, enable a remote assistance operator to provide sequential assistance to the first autonomous vehicle associated with the first request for remote assistance and the second autonomous vehicle associated with the second request for remote assistance, and provide an interface configured to display to the single remote operator a remote assistance map of an area including the first autonomous vehicle and the second autonomous vehicle and a projected path of the first autonomous vehicle and the second autonomous vehicle.

16. The non-transitory computer-readable storage medium of claim 15, wherein the first context comprises a first location and the second context comprises a second location, and wherein determining that the single remote operator is capable of providing remote assistance is based on a determination that a distance between the first location and the second location is less than a threshold distance.

17. The non-transitory computer-readable storage medium of claim 15, wherein the interface is configured to display a first camera feed from the first autonomous vehicle and a second camera feed from the second autonomous vehicle.

18. The non-transitory computer-readable storage medium of claim 15, wherein enabling the remote assistance operator to provide sequential assistance to the first autonomous vehicle and the second autonomous vehicle comprises providing, to a device associated with the remote assistance operator, a user interface that allows the remote assistance operator to select or activate an interface element representing at least one of the first autonomous vehicle and the second autonomous vehicle on an interface to exert control of the at least one of the first autonomous vehicle and the second autonomous vehicle.

19. The non-transitory computer-readable storage medium of claim 15, wherein enabling the remote assistance operator to provide sequential assistance to the first autonomous vehicle and the second autonomous vehicle comprises providing, to a device associated with the remote assistance operator, a user interface comprising one or more input options configured to allow the remote assistance operator to at least one of provide instructions to the first autonomous vehicle and the second autonomous vehicle and control the first autonomous vehicle and the second autonomous vehicle, wherein the user interface includes one or more indications that the first autonomous vehicle and the second autonomous vehicle requested remote assistance.

20. The non-transitory computer-readable storage medium of claim 15, further comprising providing, to a device associated with the remote assistance operator, a user interface comprising one or more input options configured to allow the remote assistance operator to assert control over a third autonomous vehicle by activating an interface element associated with the third autonomous vehicle.

* * * * *